(No Model.)

F. E. NADON.
ICE VELOCIPEDE.

No. 515,442.  Patented Feb. 27, 1894.

Witnesses:
E. H. Monty
K. Foley

Inventor:
F. E. Nadon,
Per J. Coursolle
Attorney.

UNITED STATES PATENT OFFICE.

FRANÇOIS EXAVIER NADON, OF RIVER DESERT, ASSIGNOR OF ONE-HALF TO JOSEPH COMEAU, OF MANIWAKI, CANADA.

ICE-VELOCIPEDE.

SPECIFICATION forming part of Letters Patent No. 515,442, dated February 27, 1894.

Application filed November 6, 1893. Serial No. 490,200. (No model.) Patented in Canada April 11, 1893, No. 42,551.

*To all whom it may concern:*

Be it known that I, FRANÇOIS EXAVIER NADON, a subject of the Queen of Great Britain, residing at River Desert, county of Ottawa, Province of Quebec, Canada, have invented certain new and useful Improvements in Ice-Velocipedes, (for which I have obtained a patent in Canada, No. 42,551, bearing date April 11, 1893;) and I do hereby declare that the following is a full, clear, and exact description of the same, reference being had to the accompanying drawings, forming a part hereof.

The object of my invention is to provide a velocipede that may be propelled over the ice or on a hard snow road, and a device whereby the machine may be steadied when used by a beginner.

Figure 1:
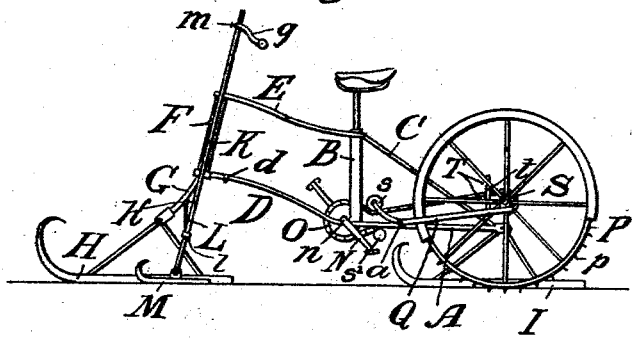
Figure 2:
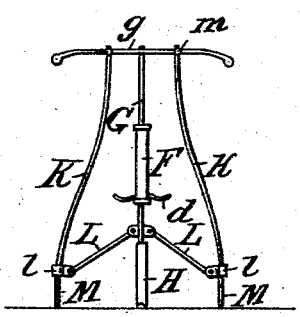
Figure 3:
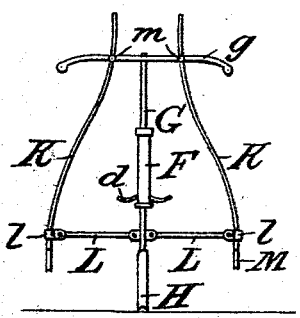
Figures 4, 5:
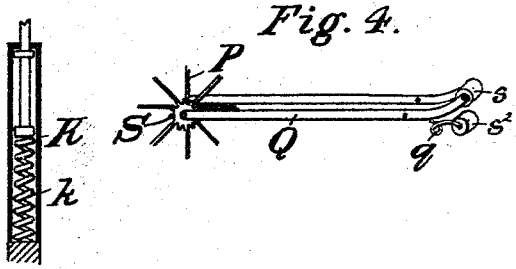

In the drawings,—Figure 1 is a side view of my improved velocipede. Fig. 2 is a front view of the same. Fig. 3 is a view similar to Fig. 2, but showing the auxiliary runner out of use. Fig. 4 is an enlarged detail view of a portion of the driving mechanism. Fig. 5 is a detail view of one of the rods holding the auxiliary runners.

This device is somewhat similar to a safety bicycle in construction having the wheels replaced by runners, and a spiked wheel for propelling it, journaled in an independent frame pivoted to the main frame, and placed close alongside the rear runner.

The main frame consists of a horizontal bar A reaching from the rear to the hollow vertical seat standard B. A diagonal bar C connects the top of this standard with the rear end of the bar A.

D and E are continuations of the bars A and C, rising toward the front where they are secured to a hollow tube F which is slightly inclined. Through the tube F passes the steering standard G carrying at its upper end the handle bar $g$ and having its lower end $h$ curved to the front, to this lower end is pivoted the front runner H. The rear runner is pivoted to the rear end of the frame. Foot rests $d$ are secured on the bars D and the saddle J is secured adjustably in the hollow standard B.

Pivoted to the lower end of the standard G are the arms L L, one on either side of the said standard, carrying at their outer ends clips $l$ in which slide the rods K, having pivoted to their lower ends the small auxiliary runners M. These rods pass up through perforations in the handle bar $g$ where they are adjustably secured by the set screws $m$.

In order more easily to pass over inequalities in the road and to admit more readily of turning curves, the rods K may be made tubular (as shown in Fig. 5) for a portion of their lengths, and a spring $k$ inserted on which the upper part of the rod rests.

The propelling gear consists of the ordinary treadles and cranks N the axle $n$ of which is journaled in bearings on the lower bar D. A sprocket wheel O is secured on this axle. The driving wheel P, having a series of spikes $p$ on its periphery, is journaled in a frame Q pivoted to the bar A at $a$. A sprocket wheel S is secured on the axle of the wheel P driven by a chain T, passing over the wheel O. The front end of the frame Q is upturned and carries a guide roller $s$. This roller keeps the driving wheel down to its work while permitting it to rise over any obstructions. A guide $s^2$ is carried in a spring arm $q$ and bears on the under side of the chain. A guide $t$ secured on the rear end of the main frame keeps the chain from coming in contact with the driving wheel.

As will be seen from Figs. 2 and 3 the auxiliary runners may be used or not as thought desirable. The runners may have their running surfaces concave or flat in cross section.

The device is propelled by the rotary motion imparted to the driving wheel, the spikes striking the ice or snow as it rotates.

I claim as my invention—

1. In an ice velocipede, the combination with a frame having a runner pivoted at its rear end and a steering bar journaled in the front thereof, having a runner pivoted to its lower end and a handle bar secured to its upper end, of auxiliary runners carried one on either side of the front runner, substantially as set forth.

2. In an ice velocipede, the combination with the main frame carrying a runner at its rear end and a steering runner at its front, of a frame pivoted to the said main frame, a propelling wheel having a spiked periphery journaled at the rear of the said frame, a sprocket wheel secured on the axle of the said wheel, a sprocket wheel secured on the axle of the treadles, a driving chain connecting the said sprocket wheels, a guide roller carried in the front end of the said frame bearing on the upper part of the driving chain, and a guide roller secured by a spring arm to the said frame bearing on the under side of the said chain, substantially as set forth.

3. In an ice velocipede, the combination with a main frame carrying runners and suitable propelling gear, of the arms L, pivoted to the steering bar G, the clips $l$, the rods K, spring $k$, the upper ends of said rods passing through perforations in the handle bar and secured by set screws $m$, and runners M pivoted to the lower ends of the said rods K, substantially as set forth.

Signed at Ottawa this 8th day of September, 1893.

FRANÇOIS EXAVIER NADON.

In presence of—
 E. H. MONTY,
 K. FOLEY.